(12) United States Patent
Vitantonio

(10) Patent No.: US 6,418,266 B1
(45) Date of Patent: Jul. 9, 2002

(54) FLIP TRAY SYSTEM FOR USE IN AN OPTICAL FIBER SPLICE CASE

(75) Inventor: Estro M. Vitantonio, Warrington, PA (US)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 09/639,728

(22) Filed: Aug. 16, 2000

Related U.S. Application Data

(60) Provisional application No. 60/149,155, filed on Aug. 16, 1999.

(51) Int. Cl.⁷ .................................................. G02B 6/00
(52) U.S. Cl. ........................ 385/135; 385/134; 385/136
(58) Field of Search ................................. 385/129–137

(56) References Cited

U.S. PATENT DOCUMENTS

| 4,373,776 A | 2/1983 | Purdy |
| 4,913,522 A | 4/1990 | Nolf et al. |
| 5,131,066 A | 7/1992 | Foss |
| 5,155,794 A | 10/1992 | Nolf et al. |
| 5,249,253 A | 9/1993 | Franckx et al. |
| 5,323,480 A | 6/1994 | Mullaney et al. |
| 5,363,466 A | * 11/1994 | Milanowski et al. ....... 385/135 |
| 5,479,553 A | 12/1995 | Daems et al. |
| 5,602,954 A | 2/1997 | Nolf et al. |
| 5,692,299 A | 12/1997 | Daems et al. |
| 5,751,882 A | 5/1998 | Daems et al. |
| 5,825,964 A | * 10/1998 | Goetter et al. ............... 385/135 |
| 5,917,984 A | * 6/1999 | Roseler et al. ............... 385/135 |
| 6,009,224 A | * 12/1999 | Allen .......................... 385/135 |

FOREIGN PATENT DOCUMENTS

| EP | 0159857 | 10/1985 |
| JP | 58-109708 | 7/1993 |
| WO | WO 94/23324 | 10/1994 |

* cited by examiner

Primary Examiner—Brian Sircus
Assistant Examiner—Michael C. Zarroli
(74) Attorney, Agent, or Firm—Fay, Sharpe, Fagan, Minnich & McKee, LLP

(57) ABSTRACT

A flip tray system and method for operating is provided for use with associated optical fiber splice cases enclosing and storing cable splices. A plurality of trays are pivotally connected to a rack member with resilient clip ears. Each of the trays includes a guide and locking area formed on a side of the tray opposite from the clip area. The guide and locking areas mechanically cooperate with each other in a manner to enable the trays to be self supported in an intermated raised position and further to be brought together into an aligned registration when the trays are brought into a collapsed orientation. In a range of intermediate positions between the opposite raised and collapsed orientations, the guide and locking areas each respectively slidably engage with trays above and beneath to ensure that the free tray ends opposite the clip area are maintained in an aligned registration. The rack member together with the trays and corresponding guide and locking areas form a set of parallel static linkages.

26 Claims, 8 Drawing Sheets

FLIP TRAY SYSTEM FOR USE IN AN OPTICAL FIBER SPLICE CASE

CROSS-REFERENCE TO RELATED APPLICATION

This application claims the benefit of U.S. Provisional Application Serial No. 60/149,155 filed Aug. 16, 1999.

BACKGROUND OF THE INVENTION

The subject invention is directed to an improved flip tray system and buffer tube organizer clip arrangement for use in waterproof cable splice enclosures to enable easy access and removal of single splice trays from a stack of trays by technicians or the like during regular maintenance or servicing. Assemblies of the type under consideration are particularly well suited for selectively holding optical fiber splice trays in a plurality of predetermined convenient raised positions during servicing and the invention will be described with particular reference thereto; however, the invention could equally well be used with other types of cable splice enclosures and tray arrangements for other applications.

Many different types of fiber optic cable enclosures are known in the prior art. These prior enclosures are satisfactory to a greater or lesser degree but often have certain shortcomings which make them inconvenient to use. In particular, most fiber optic cable enclosure systems include some form of mechanical assembly for holding a plurality of fiber splice trays in an aligned stacked relationship making access to lower trays in the stack inconvenient.

One such system is shown in U.S. Pat. No. 5,631,993 assigned to the assignee of the instant application, the teachings of which are incorporated herein by reference. As shown in the '993 patent, one or more splice trays are positioned in a stacked relationship on an elongate mounting bar that extends substantially axially along the length of another generally cylindrical splice tray housing. The splice trays carried on the mounting bar are held in a superposed relationship by a pair of spaced apart parallel threaded rods or bolts that extend upwardly from the rod. Each splice tray is provided with engagement ears on opposite outer edges thereof for intermateable connection with the upwardly extending bolts. In use, the trays are organized in their stacked relationship by sliding them individually onto the bolts.

Although the system described above holds the plurality of stacked splice trays in place between the rods within the splice case housing quite well, one shortcoming is that access to individual trays within the stack is difficult and inconvenient. More particularly, in order to gain access to a single splice tray within the stack, all the splice trays above the target tray must first be removed from the upwardly extending bolts so that the target splice tray can be reached. Sometimes, this disturbs non-target cables causing unnecessary cable damage and possible resultant service interruption.

Several manufacturers have thus offered fiber splice case products that include hinged organizer trays that are pivotally connected on one end to a bracket within the case. Since each of the splice trays are hinged to the bracket, access to individual trays within the stack is enabled by merely flipping the trays above the target tray upwardly off the stack. In some systems, the trays are individually removable from the bracket at the hinge so that the target tray can be separated from the stack and then physically removed from the fiber splice case apparatus for servicing or the like. It is important, however, when working with optical fibers to not damage or otherwise disturb connections within the optical fiber splice case that are not the target of a maintenance or service procedure. Each of these splice tray systems, however, requires excessive handling of the trays with the potential therefore to cause cable damage.

Although technicians have found optical fiber splice cases of the type that include hinged organizer trays to be advantageous over the earlier tray systems stacked on parallel rods, one difficulty has been in holding the trays in a flipped up orientation while the tray beneath is serviced. One prior art system uses a "kickstand" type bracket that can be manually inserted into the space between the target tray and the tray above hinged out of the way above. The kickstand bracket is clumsy and awkward to use.

Accordingly, it would be desirable to provide a flip tray system for use in optical fiber splice cases that is easy to use for holding selected trays in a flipped up orientation without any additional brackets, parts, or the like. The trays above the target tray are held in a raised position enabling access to the lower target tray yet without disturbing the trays beneath the target tray.

It would further be desirable to provide a flip tray system that includes a means for easily removing individual trays from the stack during regular maintenance or servicing. In that way, the single tray removed from the stack could be serviced apart from existing connections within the optical splice case without disturbing the nontargeted cables.

It would also be desirable to provide an improved organizer clip system for storing a length of slack buffer cable beneath the tray stack so that the buffer cable can be paid out from the organizer clip area as needed whenever a single tray is removed from the stack. Again, this would enable servicing of individual trays without disturbing existing connections within the optical fiber splice case.

SUMMARY OF THE INVENTION

In accordance with one aspect of the invention, there is provided a novel flip tray system for optical fiber splice trays within an optical fiber splice case. The subject flip tray system is adapted to be carried on a longitudinally extending rod or mounting bar member disposed between end plates of a typical optical fiber splice case. In that regard, a rack member of the flip tray system is attached to the longitudinal mounting bar member within the optical fiber splice case so that the rack member extends upwardly therefrom at an angle.

Each of the optical fiber splice trays preferably includes a clip area formed on one side of the tray for pivotally connecting the tray to the rack member. Suitable round tab members formed in the clip area are adapted to pivotally engage the rack member so that each of the trays can be pivotally rotated relative to the rack member and the longitudinal mounting bar within the fiber splice case. Preferably, the clips are formed of resilient plastic and the rack member includes a series of regularly spaced apart holes adapted to selectively receive the tab members carried on the clip area. In that way, individual trays can be easily removed from the stack by merely disengaging the tab member pair from the respective hole pair by squeezing the clip area.

In addition to the above, preferably, each of the fiber splice trays includes a guide and locking area formed on the side of the tray opposite from the clip area. The guide and locking areas of each splice tray are preferably identically formed and are adapted to mechanically cooperate with each other in a manner to enable the trays to be self supported in an intermated raised position and also to be brought into aligned registration when the trays are brought into a collapsed orientation. Further, in a range of intermediate positions between the opposite raised and collapsed orientations, the guide and locking areas are each respectively slidably engaged with one another to ensure that the free tray ends opposite the clip area are maintained in an aligned registration as the trays are pivoted between their collapsed orientation and the elevated and raised position.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENTS

Figure 1:
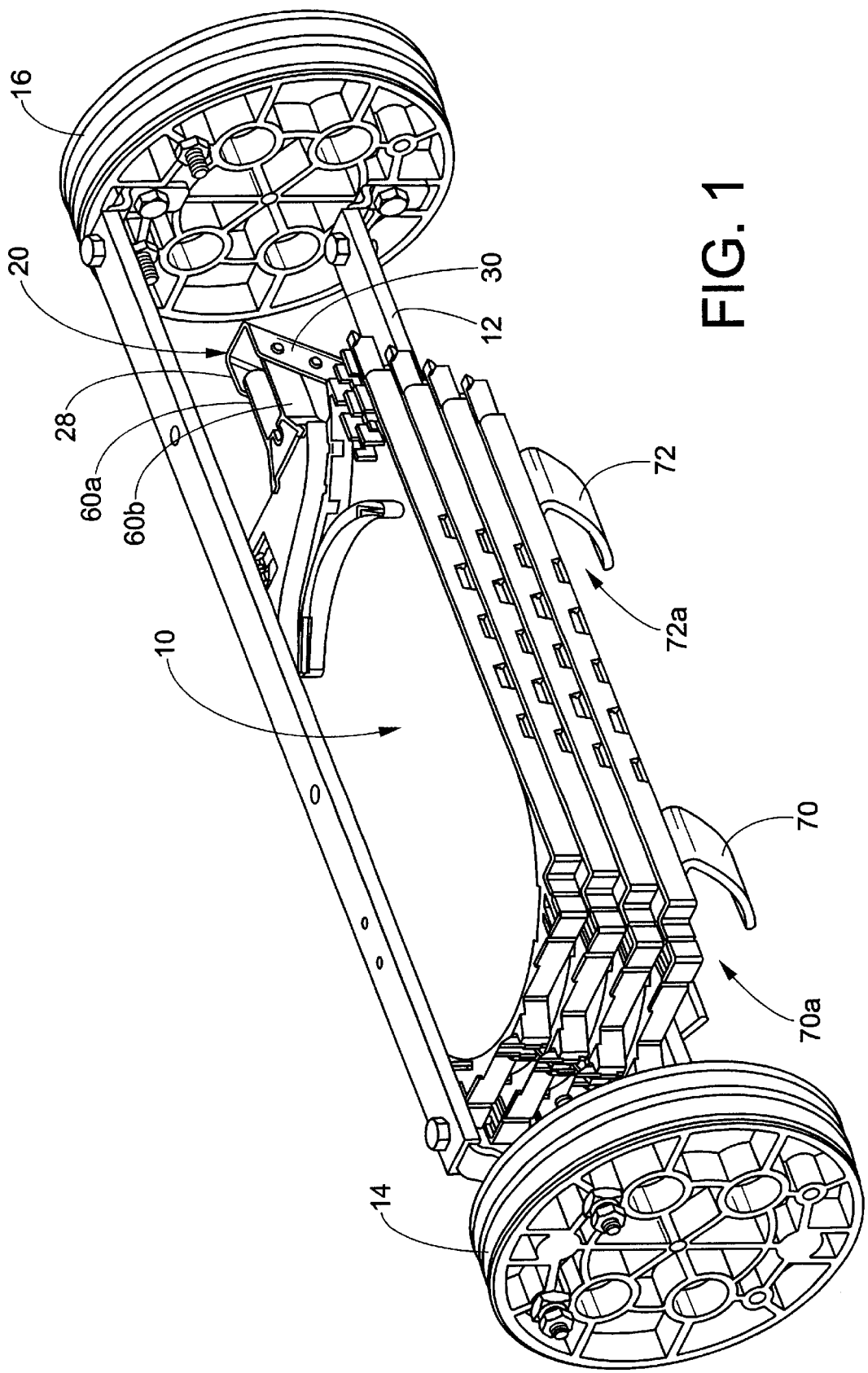
FIG. 1 is an isometric view of the preferred embodiment of the subject flip tray system shown disposed in a typical splice case with the shell-like main housing members removed.

Referring now the drawings wherein the showings are for the purposes of illustrating the preferred embodiment of the invention only and not for purposes of limiting same, the overall arrangement of the preferred construction of the subject flip tray system 10 can best be understood with reference first to FIG. 1. As illustrated therein, the flip tray system 10 is carried on an elongate bar or support member 12 extending axially between a pair of circular end plate members 14, 16 that form part of an otherwise standard optical fiber splice case. It is to be understood that the outer housing assembly for enclosing and storing cable splices forms no part of the present invention. Some of the components forming the outer housing are shown, however, for the purposes of facilitating the detailed description of the flip tray system and to describe the relationship between the system and the splice case. Further, it is to be understood that the subject flip tray system can be used in an enclosure of any size or shape and can be supported by any fixed member. Its use is not limited to the particular splice case shown in FIG. 1.

Figure 2:
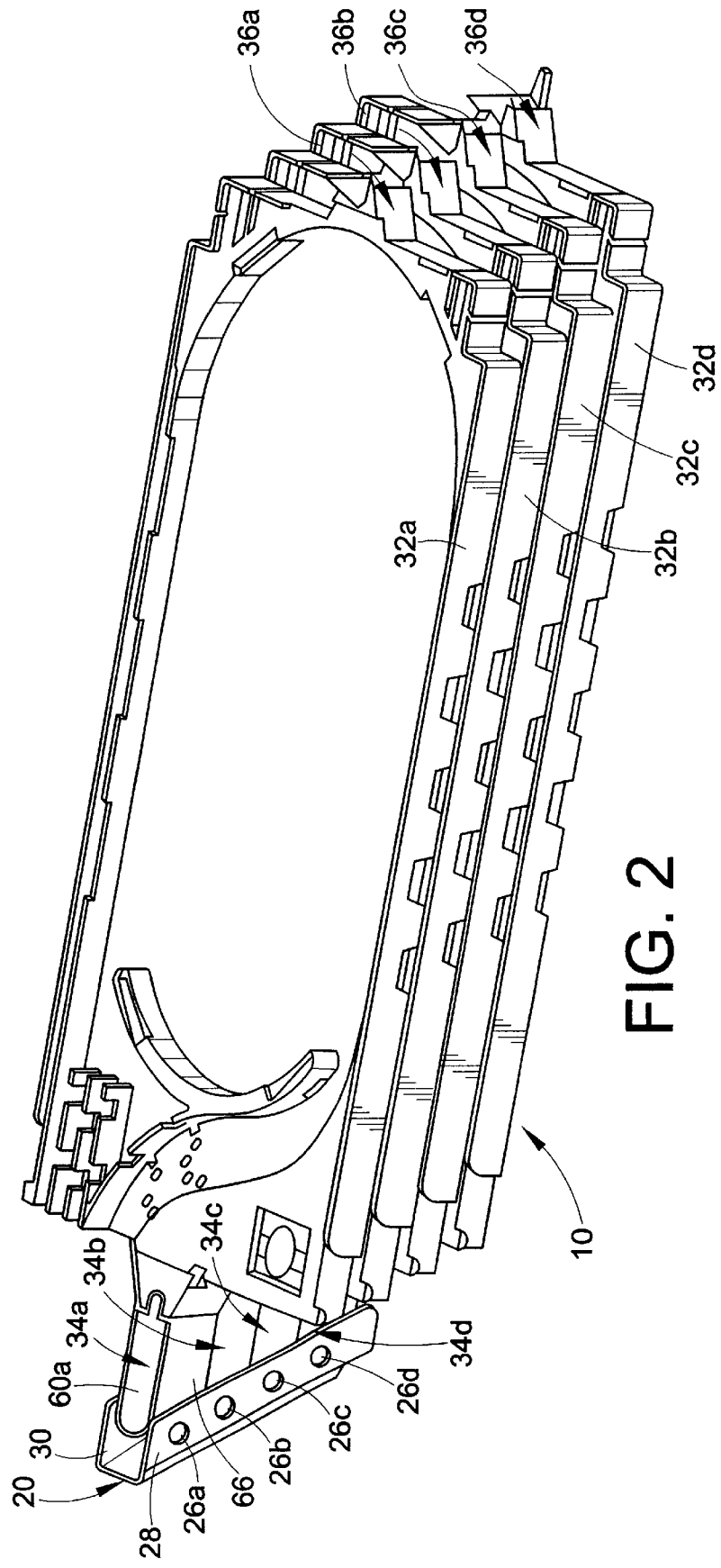
FIG. 2 is a top isometric view illustrating the subject flip tray system arranged in its collapsed orientation.
Figure 4:
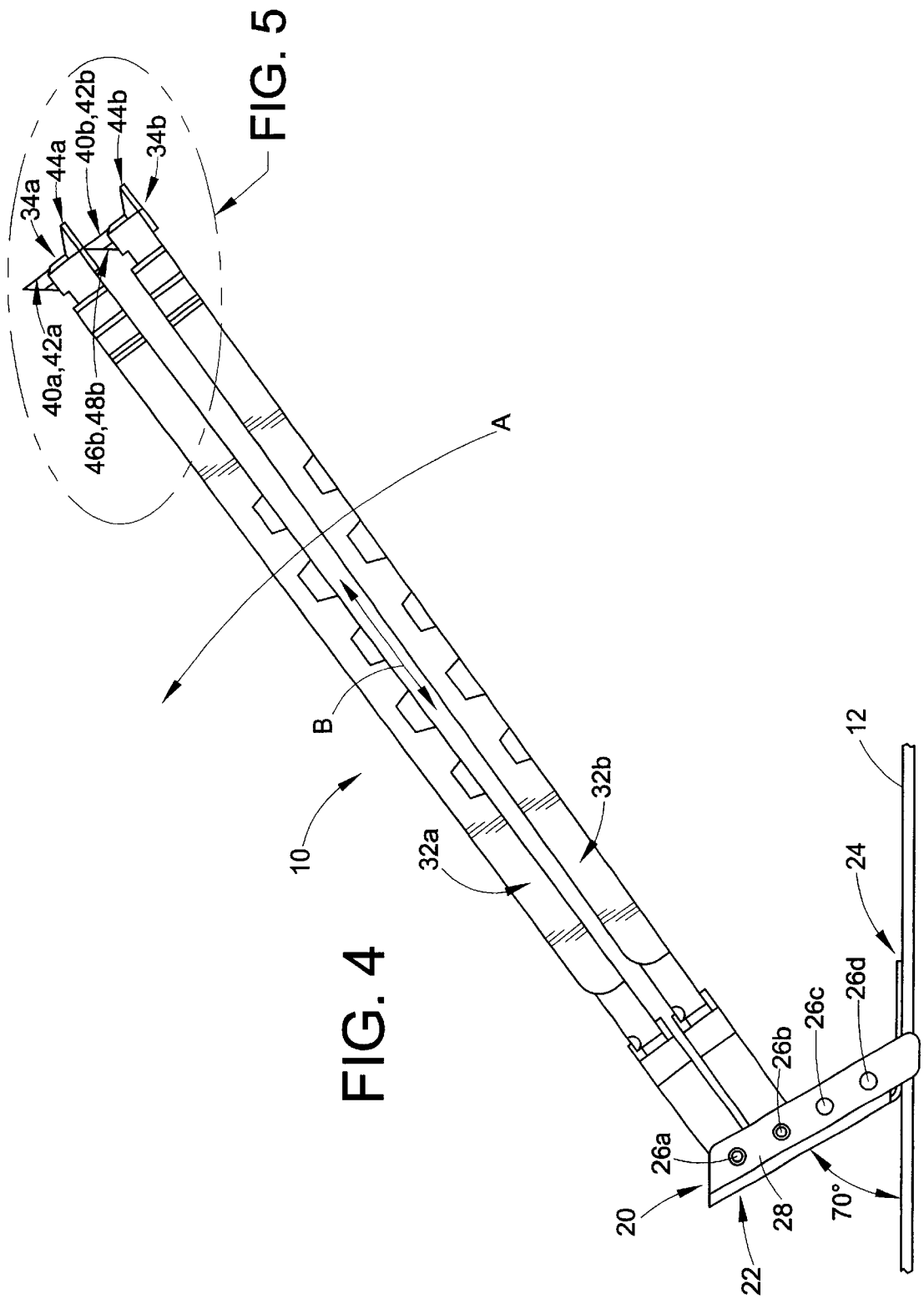
FIG. 4 is a side elevational view of the subject flip tray system showing a pair of splice trays in transition between the collapsed orientation shown in FIG. 2 and the raised position shown in FIG. 6.
Figure 6:
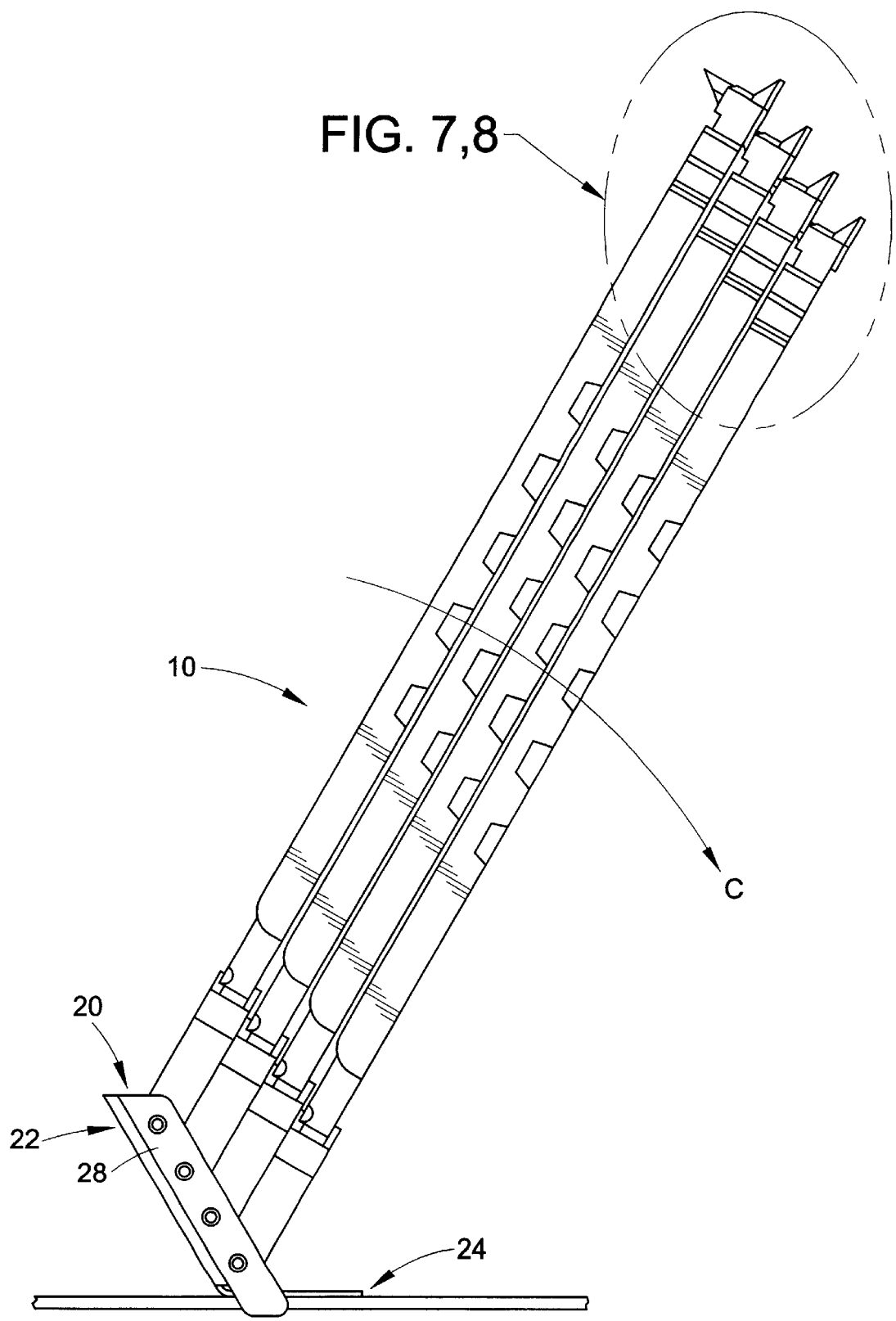
FIG. 6 is a side elevational view of the subject flip tray system showing a plurality of splice trays disposed in a raised and locked orientation.

With continued reference to FIG. 1 but with additional reference to FIG. 2, 4, and 6, the subject flip tray system 10 includes a rack member 20 adapted for connection to the elongate bar member 12. The rack member 20 is substantially U-shaped on its upper end 22 and includes a foot member 24 opposite the upper end for attachment to the elongate bar member. Preferably, the foot member 24 is fastened to the bar member using threaded fasteners or the like.

In addition to the above, the rack member 20 includes a set of substantially uniformly spaced apart hole pairs 26a, 26b, 26c, and 26d. As can be seen, the set of hole pairs 26 are arranged along the outer flanges 28, 30 of the U-shaped rack member 20 for reasons which will be subsequently described. Lastly, it is to be noted that the rack member 20 is fashioned to extend at a predetermined angle relative to the elongate bar member 12 as determined by the orientation of the foot member 24 relative to the upper end 22. As shown best in FIG. 4, the angle is preferably about 70 degrees.

Each of the plurality of splice trays 32a, 32b, 32c, and 32d includes, on opposite ends thereof, a clip area 34a, 34b, 34c, and 34d and a guide and locking area 36a, 36b, 36c, and 36d. On one end of the splice trays, each clip area 34a, 34b, 34c, and 34d interacts with the rack member 20 as the subject flip tray system 10 is pivoted between its collapsed position shown in FIGS. 1 and 2, its transitional orientation shown in FIG. 4 and its raised position shown in FIG. 6. In addition, in accordance with the present invention, each of the guide and locking areas 36a, 36b, 36c, and 36d cooperate to guide the splice trays 32a, 32b, 32c, and 32d as they move relative to one another between the collapsed position (FIG. 2) and the transitional orientation (FIG. 4). In addition, the guide and locking areas 36a, 36b, 36c, and 36d cooperate to lock the splice trays 32a, 32b, 32c, and 32d in the raised position shown best in FIG. 6. Essentially, the clip areas 34a, 34b, 34c, and 34d, the guide and locking areas 36a, 36b, 36c, and 36d, together with the bodies of the splice trays 32a, 32b, 32c, and 32d form a set of parallelogram linkages that lock the flip tray system in place as shown in FIG. 6. The system remains in place static against downward forces as viewed in the drawing such as, for example, gravity as each subsequent underlying guide and locking area 36a, 36b, 36c, and 36d engages under a corresponding upper guide and locking area in the tray above.

Figure 3:
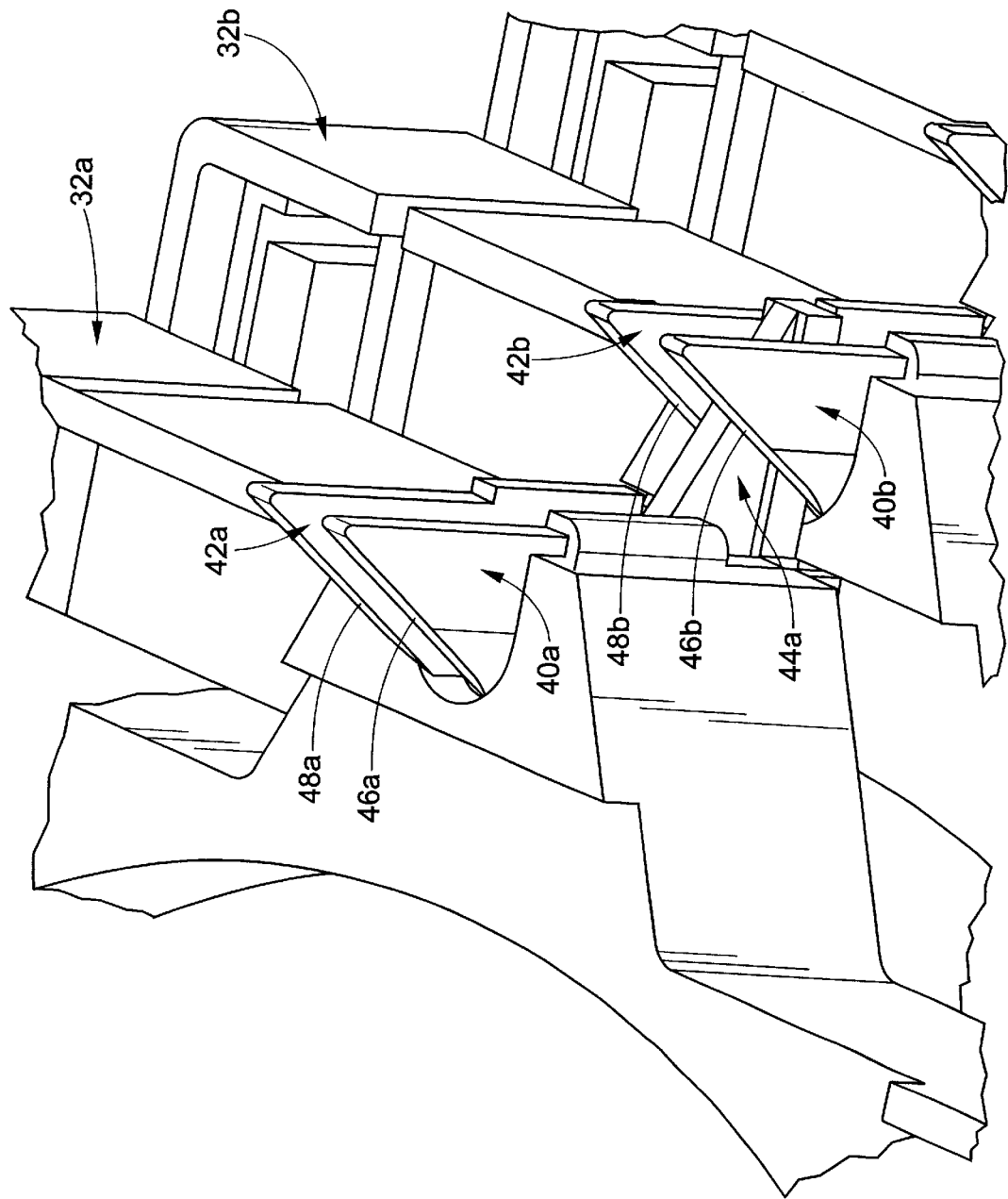
FIG. 3 is an enlarged top isometric view of the circled area of FIG. 2.

As can best be seen in FIGS. 3 and 4, each guide and locking area 36a, 36b, 36c, and 36d includes a pair of vertically oriented guide rails 40a, 40b, 40c, and 40d and 42a, 42b, 42c, and 42d. The guide rails extend upwardly from the top surface of each splice tray and are spaced apart in order to accommodate a guide finger 44a, 44b, 44c, and 44d form the tray above therebetween. More particularly, as shown in FIG. 3, the pair of guide rails 40b and 42b carried on the second splice tray 32b extend upwardly from the lower splice tray and are spaced apart so as to accommodate the outwardly extending guide finger 44a carried on the upper splice tray 32a. In a corresponding fashion, the guide rails in the guide and locking areas in each of the splice trays accommodate the guide fingers extending from the splice tray just above. An important feature of the present invention is that the cooperative interaction between the guide rails and guide fingers when the splice trays 32a, 32b, 32c, and 32d are in their collapsed position as shown in FIGS. 1–3 substantially hold the free ends of the splice trays opposite the rack member in a substantially aligned orientation and loosely interlocked.

Figure 5:
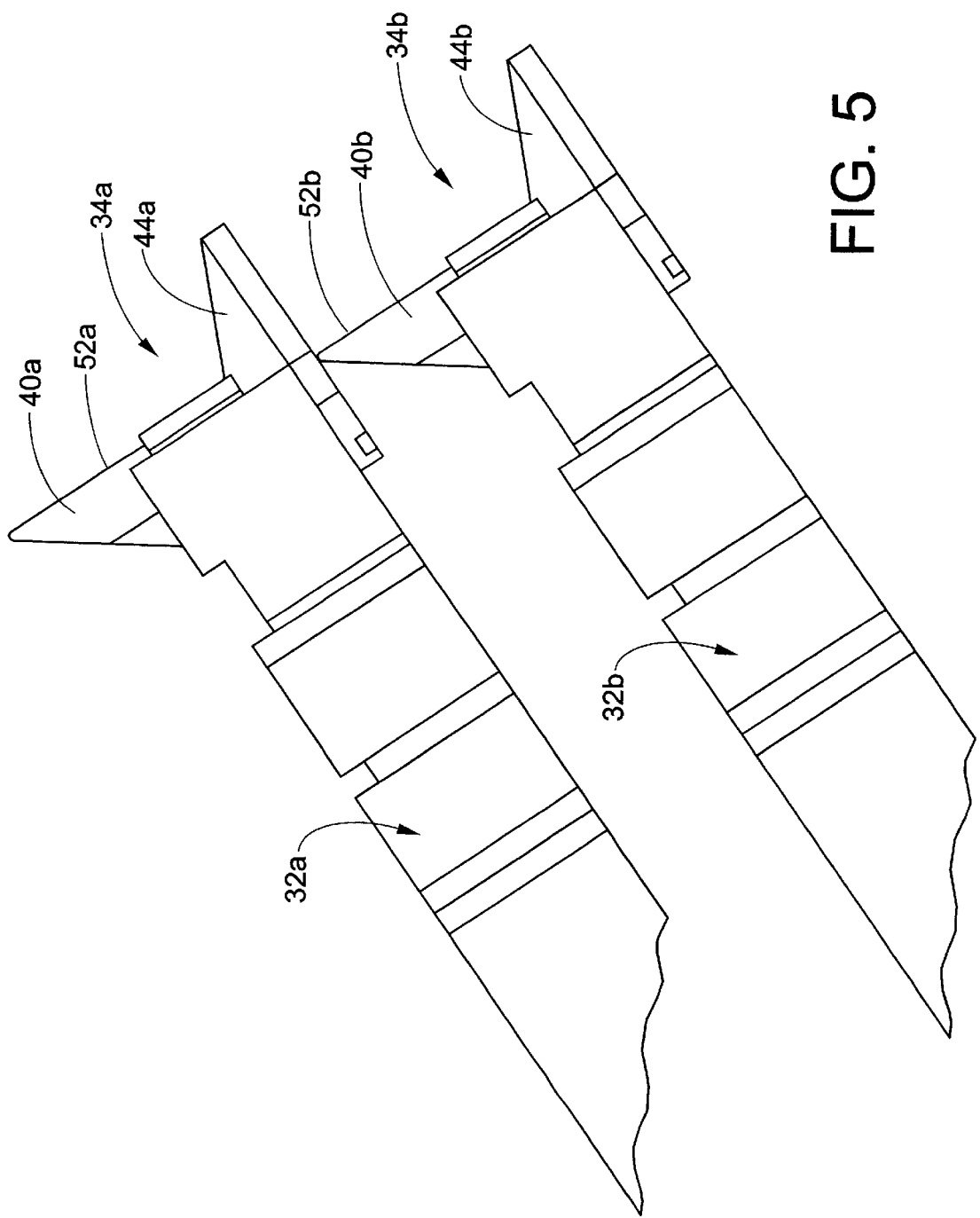
FIG. 5 is an enlarged side plan view of the circled area of FIG. 4.

Of particular importance to the present invention is the shape of the guide rails 40a, 40b, 40c, 40d and 42a, 42b, 42c, and 42d. More particularly, as shown in FIGS. 3–5, each of the guide rails defines a smooth engagement surface 46a, 46b, 46c, 46d and 48a, 48b, 48c, and 48d adapted to contact the underside of the clip area on the splice tray just above. In that regard, as can be seen best in FIGS. 4 and 5, as the splice trays 32a, 32b are rotated upwardly in the direction marked "A", the pair of engagement surfaces 46b, 48b on the clip area 34b of the second splice tray 32b engage the underside of the clip area 34a on the splice tray 32a immediately above. Essentially, as those of skill in the art will understand, the angle between the rack member 20 and the associated elongate bar member 12 together with the spacing between the hole pairs 26a, 26b, 26c, and 26d generates relative lateral motion between the splice trays 32a, 32b along the direction marked "B" in FIG. 4. It is this relative motion that enables the engagement surfaces to be brought into aligned contact with the guide and locking areas on the splice trays above, the splice trays essentially moving laterally relative to one another from the position and orientation shown in FIG. 3 to the position shown in FIG. 4 during transition.

Figure 7:
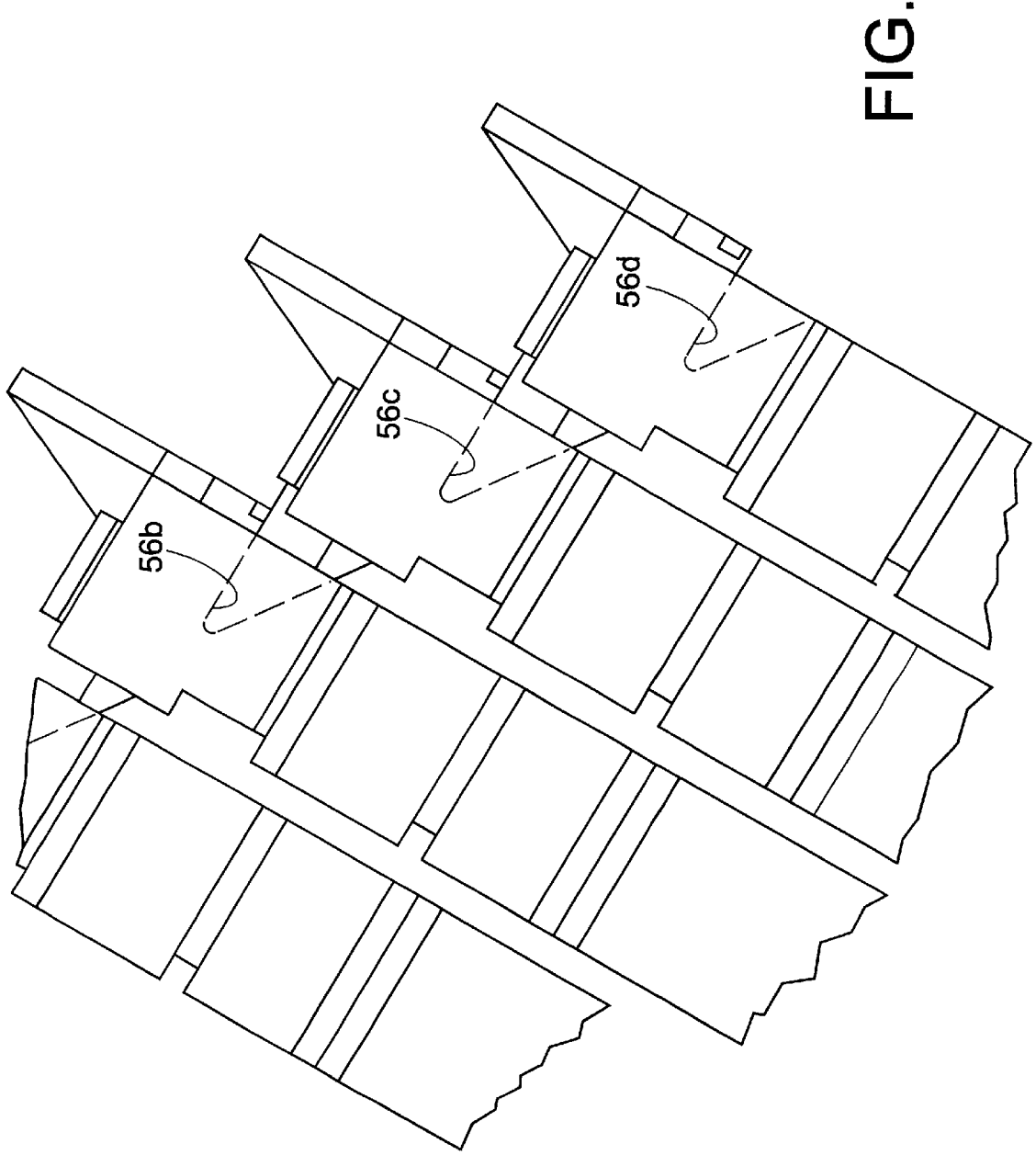
FIG. 7 is an enlarged side elevational view of the circled area of FIG. 6.
Figure 8:
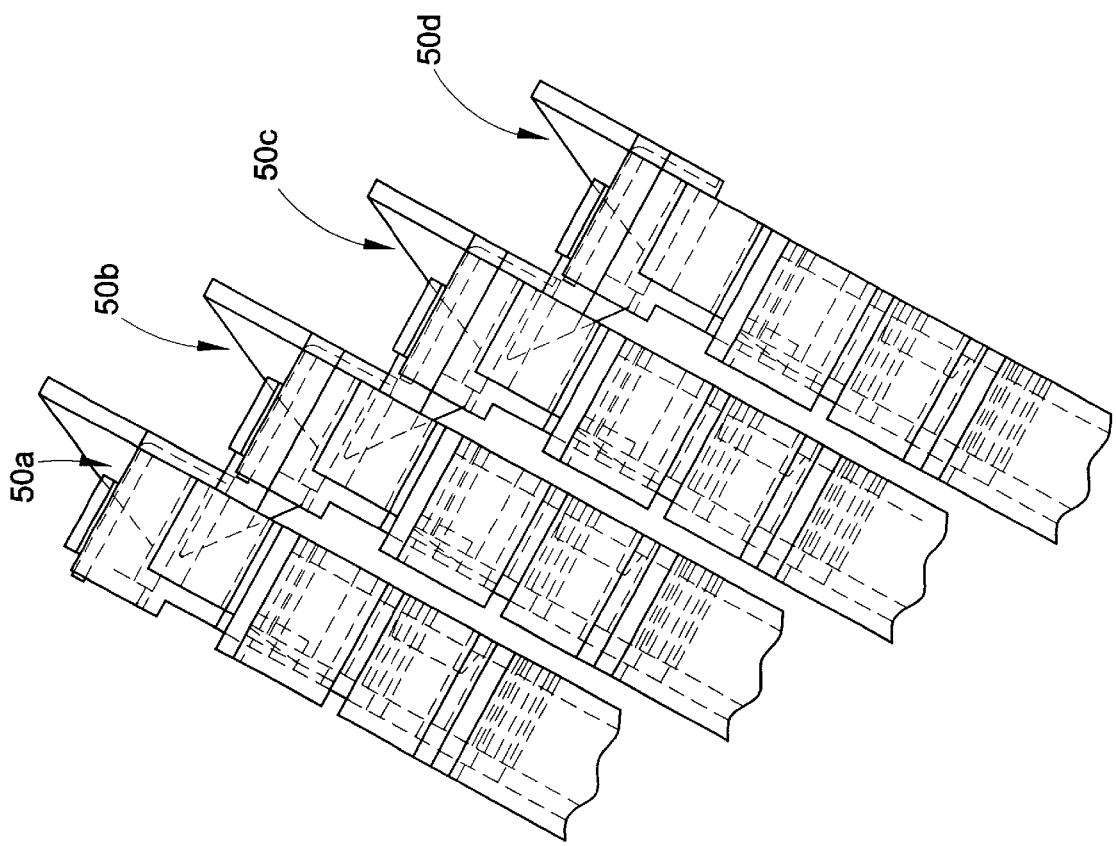
FIG. 8 is an enlarged side elevational view of the circled area of FIG. 6 shown in partial cross section.

Of further particular importance to the present invention, each of the guide and locking areas 34a, 34b, 34c, and 34d includes a pocket area 50a, 50b, 50c, and 50d as best shown in FIG. 8. In the raised position of the subject flip tray system 10 shown in FIGS. 6–8, the relative lateral orientation between each adjacent guide and locking area enables the guide rails 40b, 40c, and 40d to engage behind and to be received within the corresponding set of pocket areas 50a, 50b, and 50c on each splice tray immediately above 32a, 32b, and 32c, respectively. Preferably, each of the guide rails 40a, 40b, 40c, 40d and 42a, 42b, 42c, 42d defines a rearward facing vertically oriented locking wall 52a, 52b, 52c, 52d and 54a, 54b, 54c, 54d (FIG. 3), respectively. Preferably, each of the pocket areas 50a, 50b, 50c, 50d defines a corresponding set of locking surfaces 56a, 56b, 56c, 56d and 58a, 58b, 58c, 58d that are adapted to engage the locking walls 52a, 52b, 52c, and 52d and 54a, 54b, 54c, and 54d when the set of splice trays 32a, 32b, 32c, and 32d are held in the raised position shown best in FIGS. 6–8. Essentially, the guide and locking areas "fall into place" as the flip tray system is moved from the intermediate position shown in FIG. 4 to the raised position shown in FIG. 6 along the path A.

It is a unique feature of the present invention that the flip tray system 10 rests stably in the raised position shown in FIG. 6 against the force of gravity tending to urge the splice trays downwardly along the direction labeled "C" in the figure. As described above, the parallelogram linkage system created by the angle of the rack member 20 and the positions of the splice trays relative to each other together with the interaction between the interlocking guide and locking areas on each splice tray, effectively creates a static stacked interlock splice tray structure comprising the flip tray system 10 in accordance with the present invention.

Turning back now to FIGS. 1 and 2, another novel feature of the present invention will be described. Each splice tray can be easily removed from the rack by merely grasping and squeezing the clip area manually. To that end, each clip area includes a pair of resilient clip ears 60a, 60b extending laterally from the splice tray wall. Each resilient clip ear carries an outwardly extending tab member 62a, 62b having a size and shape for easy insertion into the set of hole pairs 26a, 26b, 26c, 26d arranged along the upper end 22 of the rack member 20. Preferably, the resilient clip ears are made of a resilient plastic so that a service technician or maintenance personnel can easily squeeze the clip ears toward one another and then withdraw the target splice tray from the stacked arrangement. It is to be noted that when it is desired to extract a certain splice tray from near the bottom of the stack, the subject invention enables a technician to merely pivot the several overlying splice trays into the raised position shown in FIG. 6 to easily gain access to the target splice tray that is preferably left in the collapsed position such as shown in FIG. 2. The raised trays are held in position automatically as described above. At that point, it is easy for maintenance personnel to release the target splice tray from the rack member by merely squeezing the resilient clip ears together.

In furtherance of the benefits deriving from the subject flip tray system, reference is directed once again to FIG. 1 whereat there is shown a set of downwardly oriented organizer clip members 70, 72. As shown there, each of the organizer clip members is substantially "D" shaped with a flat portion oriented toward the splice tray stack. An important feature of the subject flip tray system is that each organizer clip member defines an opening 70a, 72a, respectively that is arranged for easy access from below. More particularly, those skilled in the art know that buffer tubes are typically carried within the splice enclosure. In accordance with the present invention, single splice trays can be easily removed from the stack of trays in a manner described above. After the tray is removed from the stack, the shape and orientation of the organizer clip members 70, 72 enable a technician or maintenance person to simply pay out slack buffer tube lengths from the storage area beneath the splice trays defined by the organizer clip members. In prior art systems, clip type members were often difficult to use. The openings were not easily accessible from the bottom and therefore oftentimes non-target areas within the splice case were disturbed inadvertently because of tangling, mishandling, or the like as buffer tube were removed from the storage area.

The invention has been described with reference to the preferred embodiment. Obviously, modifications and alterations will occur to others upon a reading and understanding of the specification. It is intended to include all such modifications and alterations insofar as they come within the scope of the drawing figures, the specification above, or the equivalents thereof.

Having thus described the invention, it is claimed:

1. A flip tray system for use with optical fiber cable enclosures, the flip tray system comprising:

a support member;

a rack member extending from the support member;

a first splice tray pivotally connected to the rack member for rotational movement relative to the rack member from a first splice tray rest position oriented substantially parallel with a support member to a first splice tray raised position oriented substantially perpendicular with the rack member;

a second splice tray pivotally connected to the rack member for rotational movement relative to the rack member from a second splice tray rest position oriented substantially parallel with the support member to a second splice tray raised position oriented substantially perpendicular with the rack member, the second splice tray being carried on the rack member in an operative position disposed between the first splice tray and the support member; and, first an second interlock mechanisms formed on the first and second splice trays, respectively, the first and second interlock mechanisms being mutually engagable for preventing the first and second splice trays from rotating from their respective raised positions to their respective rest positions, the first and second interlock mechanisms being mutually engagable when the first and second splice trays are rotated from their respective rest positions to their respective raised positions for preventing the first and second splice trays from rotating from their respective raised positions to their respective rest positions, the first interlock mechanism formed on the first splice tray including at least one first splice tray recess pair formed in a surface of the first splice tray oriented towards the second splice tray and further including an outwardly extending guide finger, and the second interlock mechanism formed on the second splice tray including at least one second splice tray raised guide rail pair formed on a surface of the second splice tray oriented towards the first splice tray, the guide finger and the at least one second splice tray raised guide rail pair being intermated when the first and second splice trays are in their respective rest positions and the at least one first splice tray recess pair and the at least one second splice tray raised guide rail pair being intermated when the first and second splice trays are in their respective raised positions.

2. The flip tray system according to claim 1 wherein the first and second interlock mechanisms are mutually engagable when the first and second splice trays are rotated substantially in unison from their respective rest positions to their respective raised positions.

3. The flip tray system according to claim 1 wherein:

the second splice tray is carried on the rack member in an operative position disposed between the first splice tray and the support member;

the first interlock mechanism formed on the first splice tray includes at least one first splice tray recess formed in a surface of the first splice tray oriented towards the second splice tray; and, the second interlock mechanism formed on the second splice tray includes at least one second splice tray raised guide rail member formed on a surface of the second splice tray oriented towards the first splice tray, the at least one first splice tray recess and the at least one second splice tray raised guide rail member being intermated when the first and second splice trays are rotated from their respective rest positions to their respective raised positions.

4. The flip tray system according to claim 3 wherein:

the first and second splice trays are interchangeable on said rack member so that in a first orientation, the second splice tray is carried on the rack member in a position disposed between the first splice tray and the support member, and in a second orientation, the first splice tray is carried on the rack member in a position disposed between the second splice tray and the support member;

the first interlock mechanism formed on the first splice tray further includes at least one first splice tray raised guide rail member formed on a surface of the first splice tray opposite from at least one first splice tray recess; and, the second interlock mechanism formed on the second splice tray further includes at least one second splice tray recess formed in a surface of the second splice tray opposite from said at least one second splice tray raised guide rail member.

5. The flip tray system according to claim 3 wherein the rack member, the first and second slice trays, and the first and second interlock mechanisms form a static parallelogram linkage system when the first and second splice trays are in their respective said raised positions with the first and second interlock mechanisms interlocked.

6. The flip tray system according to claim 5 wherein the rack member extends from said support member at an angle of about 70 degrees.

7. A tray system for use with a housing assembly enclosing and storing cable splices, the tray system comprising:

a mounting rack member; and, an aligned stack of trays pivotally carried on the rack member, the stack of trays being selectively movable from a lowered rest position relative to the rack member to a raised position and being self-supporting in said raised position, each of the trays includes interengagable guide members for aligning the trays in said rest position and for interlocking the trays in said raised position, the interengagable guide members including:

at least one finger member extending from an edge of a respective tray; and, at least one guide member extending from a first surface of a respective tray, wherein the at least one finger member and the at least one guide member of adjacent trays are interengaged as the adjacent trays are pivoted relative to the rack member from said rest position to said raised position.

8. The tray system according to claim 7 wherein the interengagable guide members further include at least one recess formed in a second surface opposite said first surface of the respective tray, wherein the at least one member and the at least one recess of adjacent trays carried on the rack member are interengagable when the adjacent trays are pivoted relative to the rack member from said rest position to said raised position.

9. The tray system according to claim 8 wherein the at least one recess and the at least one member prevent movement of said adjacent trays from said raised position towards said rest position.

10. The tray system according to claim 7 wherein the stack of trays are pivotally carried on said mounting rack member by resilient clip ears biased into engagement with the rack member, each said tray being removable from said rack member by urging said resilient clip ears out of engagement with corresponding clip areas formed on said rack member.

11. The tray system according to claim 7 further including a set of substantially D-shaped organizer clip members formed with a substantially flat portion oriented towards said stack of trays and arcuate portions oriented away from said stack of trays.

12. The tray system according to claim 11 wherein said D-shaped organizer clip members are adapted to receive and hold associated cable buffer tube.

13. A method of operating a flip tray system in an associated housing assembly enclosing and storing cable splices, the method comprising the steps of:

providing first and second trays pivotally connected to a rack member held a fixed relationship relative to the associated housing assembly;

generating relative motion between the first and second trays by pivoting the first and second trays in a first direction relative to said rack member;

receiving a portion of the first tray in a portion of the second tray; and, generating relative motion between the first and second trays in a second direction opposite the first direction by pivoting the first and second trays in a second direction opposite said first direction, relative to said rack member until the portion of the first tray interlocks with the portion of the second tray to prevent motion of the first and second trays further in said second direction to hold the first and second trays in a raised position relative to said rack member.

14. A flip tray system for use with optical fiber cable enclosures, the flip tray system comprising:
a rack member;
a first splice tray pivotally connected to the rack member for rotational movement relative to the rack member from a first splice tray rest position oriented substantially parallel with the rack member to a first splice tray raised position oriented substantially perpendicular with the rack member;
a second splice tray pivotally connected to the rack member for rotational movement relative to the rack member from a second splice tray rest position oriented substantially parallel with the rack member to a second splice tray raised position oriented substantially perpendicular with the rack member;
a first interlock mechanism formed on the first splice tray including at least one first splice tray recess formed in a surface of the first splice tray oriented towards the second splice tray and further including an outwardly extending guide finger; and,
a second interlock mechanism formed on the second splice tray including at least one second splice tray raised guide rail formed on a surface of the second splice tray oriented towards the first splice tray, the guide finger and the at least one second splice tray raised guide rail being intermated when the first and second splice trays are in their respective rest positions and the at least one first splice tray recess and the at least one second splice tray raised guide rail being intermated when the first and second splice trays are in their respective raised positions to prevent the first and second splice trays from rotating from their respective raised positions to their respective rest positions.

15. The flip tray system according to claim 14 wherein the first and second interlock mechanisms are mutually engagable when the first and second splice trays are rotated from their respective rest positions to their respective raised positions for preventing the first and second splice trays from rotating from their respective raised positions to their respective rest positions.

16. The flip tray system according to claim 15 wherein the first and second interlock mechanisms are mutually engagable when the first and second splice trays are rotated substantially in unison from their respective rest positions to their respective raised positions.

17. The flip tray system according to claim 15 wherein:
the second splice tray is carried on the rack member in an operative position disposed between the first splice tray and the rack member;
the first interlock mechanism formed on the first splice tray includes at least one first splice tray recess formed in a surface of the first splice tray oriented towards the second splice tray; and,
the second interlock mechanism formed on the second splice tray includes at least one second splice tray raised guide rail member formed on a surface of the second splice tray oriented towards the first splice tray, the at least one first splice tray recess and the at least one second splice tray raised guide rail member being intermated when the first and second splice trays are rotated from their respective rest positions to their respective raised positions.

18. The flip tray system according to claim 17 wherein:
the first and second splice trays are interchangeable on said rack member so that in a first orientation, the second splice tray is carried on the rack member in a position disposed between the first splice tray and the rack member, and in a second orientation, the first splice tray is carried on the rack member in a position disposed between the second splice tray and the rack member;
the first interlock mechanism formed on the first splice tray further includes at least one first splice tray raised guide rail member formed on a surface of the first splice tray opposite from at least one first splice tray recess; and,
the second interlock mechanism formed on the second splice tray further includes at least one second splice tray recess formed in a surface of the second splice tray opposite from said at least one second splice tray raised guide rail member.

19. The flip tray system according to claim 17 wherein the rack member, the first and second slice trays, and the first and second interlock mechanisms form a static parallelogram linkage system when the first and second splice trays are in their respective said raised positions with the first and second interlock mechanisms interlocked.

20. The flip tray system according to claim 19 wherein the rack member is supported relative to the cable closure by a mounting bar member.

21. A flip tray system comprising:
a rack member;
a first tray pivotally connected to the rack member for rotational movement relative to the rack member from a first tray rest position to a first tray raised position;
a second tray pivotally connected to the rack member for rotational movement relative to the rack member from a second tray rest position to a second splice tray raised position;
at least one recess formed in a surface of the first tray oriented towards the second tray;
an outwardly extending guide finger carried on the first tray; and,
at least one raised guide formed on a surface of the second tray oriented towards the first tray, the guide finger and the at least one raised guide rail being intermated when the first and second splice trays are in their respective rest positions and the at least one recess and the at least one raised guide rail being intermated when the first and second trays are in their respective raised positions for preventing the first and second trays from rotating from their respective raised positions to their respective rest positions.

22. The flip tray system according to claim 21 wherein the guide finger and guide rail are mutually engagable as the first and second trays are rotated from their respective rest positions.

23. The flip tray system according to claim 22 wherein the guide finger and guide rail are mutually engagable when the first and second trays are rotated substantially in unison from their respective rest positions to their respective raised positions.

24. The flip tray system according to claim 21 wherein the first and second trays are interchangeable on said rack member.

25. The flip tray system according to claim 21 wherein the rack member, the first and second trays, the at least one recess, and the at least one guide rail form a static parallelogram linkage system when the first and second trays are in their respective raised positions with the at least one recess, and the at least one guide rail interlocked.

26. A tray system for use with a housing assembly, the tray system comprising:
  a mounting rack member; and,
  an aligned stack of trays carried on the rack member, the stack of trays being selectively movable from a lowered rest position relative to the rack member to a raised position and being self-supporting in said raised position, each of the trays including interengagable guide members for aligning the trays in said rest position and for interlocking the trays in said rest position, the interengagable guide members including:
  at least one finger member extending from an edge of a respective tray;
  a smooth engagement surface adapted to contact an underside of an adjacent tray; and,
  at least one guide member extending from a first surface of a respective tray, wherein the at least one finger member and the at least one guide member of adjacent trays are interengaged as the adjacent trays are pivoted relative to the rack member from said rest position to said raised position and wherein the smooth engagement surface and an underside of adjacent trays contact as the adjacent trays are pivoted.

* * * * *